(12) United States Patent
Kanevsky et al.

(10) Patent No.: US 9,607,573 B2
(45) Date of Patent: Mar. 28, 2017

(54) AVATAR MOTION MODIFICATION

(71) Applicant: International Business Machines Corporation, Armonk, NY (US)

(72) Inventors: Dimitri Kanevsky, Ossining, NY (US);
James R. Kozloski, New Fairfield, CT (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 44 days.

(21) Appl. No.: 14/488,527

(22) Filed: Sep. 17, 2014

(65) Prior Publication Data

US 2016/0078635 A1    Mar. 17, 2016

(51) Int. Cl.

| | | |
|---|---|---|
| *G06T 15/00* | (2011.01) | |
| *G09G 5/00* | (2006.01) | |
| *G06F 17/30* | (2006.01) | |
| *G06K 9/00* | (2006.01) | |
| *G06K 9/62* | (2006.01) | |
| *G06T 13/40* | (2011.01) | |
| *A63F 13/428* | (2014.01) | |

(52) U.S. Cl.
CPC ........... *G09G 5/003* (2013.01); *A63F 13/428* (2014.09); *G06F 17/3028* (2013.01); *G06K 9/00335* (2013.01); *G06K 9/6215* (2013.01); *G06T 13/40* (2013.01)

(58) Field of Classification Search
CPC .... G06T 19/006; G06F 3/011; G06K 9/00342
USPC ...................... 345/473, 474, 475; 375/240.08
See application file for complete search history.

(56) References Cited

U.S. PATENT DOCUMENTS

| | | | |
|---|---|---|---|
| 8,253,746 B2 | 8/2012 | Geisner et al. | |
| 8,284,157 B2 | 10/2012 | Markovic et al. | |
| 8,451,278 B2 * | 5/2013 | Geisner .................. | G06F 3/011 |
| | | | 345/474 |

(Continued)

FOREIGN PATENT DOCUMENTS

| | | | |
|---|---|---|---|
| EP | 2016562 A2 | 1/2009 | ............. G06T 15/70 |
| EP | 2182469 A2 | 5/2010 | ............... G06K 9/00 |

(Continued)

OTHER PUBLICATIONS

Groenda, H. Nowak, F. & Röβler, P. et al. (2005). Telepresence Techniques for Controlling Avatar Motion in First Person Games, Intelligent Technologies for Interactive Entertainment, 44-53: See sections 3.2 & 3.3.

(Continued)

*Primary Examiner* — Phu K Nguyen
(74) *Attorney, Agent, or Firm* — Ido Tuchman; Kevin Jordan

(57) ABSTRACT

A method, system and computer program for modifying avatar motion. The method includes receiving an input motion, determining an input motion model for the input motion sequence, and modifying an avatar motion model associated with the stored avatar to approximate the input motion model for the input motion sequence when the avatar motion model does not approximate the input motion model. The stored avatar is presented after the avatar motion model associated with the stored avatar is modified to approximate the input motion model for the input motion sequence.

20 Claims, 4 Drawing Sheets

(56) References Cited

U.S. PATENT DOCUMENTS

| | | | |
|---|---|---|---|
| 8,462,198 B2* | 6/2013 | Lin | G06T 19/006 345/473 |
| 8,660,310 B2* | 2/2014 | Mathe | G06K 9/00342 375/240.08 |
| 8,749,557 B2* | 6/2014 | Evertt | G06F 3/011 345/473 |
| 2008/0158232 A1 | 7/2008 | Shuster | |
| 2010/0013828 A1 | 1/2010 | Castelli et al. | |
| 2010/0146052 A1 | 6/2010 | Pare et al. | |
| 2011/0175918 A1 | 7/2011 | Liu et al. | |
| 2012/0262558 A1 | 10/2012 | Boger | 348/61 |

FOREIGN PATENT DOCUMENTS

| | | | |
|---|---|---|---|
| EP | 2435147 A2 | 4/2012 | G06F 3/017 |
| EP | 2499550 A1 | 9/2012 | G06F 3/01 |

OTHER PUBLICATIONS

Oshita, M. (2006). Motion-capture-based avatar control framework in third-person view virtual environments. In Proceedings of the 2006 ACM SIGCHI international conference on Advances in computer entertainment technology (ACE '06). Doi=10.1145/1178823. 1178826 : See section 5, 5.2 , 5.3 & 7.

Yang, Z. Yu, B. & Wu, W. et al. (2006). Collaborative dancing in tele-immersive environment. In Proceedings of the 14th annual ACM international conference on Multimedia (Multimedia '06). 723-726. Doi=10.1145/1180639.1180793: See section 3.1.

\* cited by examiner

AVATAR MOTION MODIFICATION

BACKGROUND

The present invention relates to avatar manipulation, and more particularly to a method and system for modifying avatar motion.

Today, virtual worlds, 3-D Internet, massive multi-player games, character animation in movies, tele-presence, virtual meetings, and related are becoming more popular and important. 3-D interactive games are becoming increasingly popular. People may conduct business in virtual worlds. Meetings may sometimes represent attendees using avatar representations. Teachers in the form of avatars may interact with students.

Similarly, given today's environment of expensive travel and increased cost-cutting, more businesses are making transactions using the telephone, using avatars in virtual meeting rooms, and via other remote methods rather than face-to-face meetings. It is therefore desirable to make the best impression in these remote communications, since new forms of communication are becoming common modes of performing business, and individuals need to create impressions given access only to multimedia channels.

Similarly, novice users of avatars in virtual worlds (e.g., Second Life) and 3-D games may need help in moving their avatars and performing gestures. Beginners often do not know how to control their avatars to provide various nuances. Also, some gestures may have different meanings for different viewers of the gestures.

Similarly, increasingly more characters in movies are actually based on avatars that are controlled by a human actor. Such avatars may have subtle motions, methods of running, gestures, etc. On any given day, at any particular point during the day, a controller of an avatar might not be in best form. A user may be tired, inexperienced, or have motor deficits. A user of an avatar may desire to make a convincing sales pitch or compelling presentation, but cannot naturally and easily exhibit the level of motion enthusiasm and nuance that he/she would want in order to appear authoritative, energetic, contrite, etc. Some users may be unable to attain the broad gestural range that is needed in a particular setting, due to disabilities that include poor motor control or autism of various degrees.

Alternatives to avatar use include corresponding through text, and using textual cues to indicate emotion, energy, contrition, etc. However text (or traditional phone calls) is not always the ideal channel to use to conduct business. Another option involves face-to-face meetings, where other characteristics (affect, gestures, etc.) can be made use of to make strong and/or subtle points. However, as mentioned, face-to-face meetings are not always logistically possible.

BRIEF SUMMARY

Accordingly, one example of the present invention is a method for modifying avatar motion. The method includes receiving an input motion sequence. The method further includes determining an input motion model for the input motion sequence. The method further includes modifying an avatar motion model associated with a stored avatar to approximate the input motion model for the input motion sequence when the avatar motion model does not approximate the input motion model. Additionally, the method includes presenting the stored avatar after the avatar motion model associated with the stored avatar is modified to approximate the input motion model for the input motion sequence.

Another example of the present invention is a system for modifying avatar motion. The system includes a system memory and a computer processor coupled to the system memory. The system further includes a receiving unit coupled to the computer processor. The receiving unit receives an input motion sequence. The system further includes a determining unit to determine an input motion model for the input motion sequence. The system further includes a modifying unit to modify an avatar motion model associated with a stored avatar to approximate the input motion model for the input motion sequence, when the avatar motion model does not approximate the input motion model. The system further includes a presenting unit to present the stored avatar after the avatar motion model associated with the stored avatar is modified to approximate the input motion model for the input motion sequence.

Yet another example embodiment of the present invention is a computer program product for modifying avatar motion. The computer program product includes computer readable program code configured to: receive an input motion sequence; determine an input motion model for the input motion sequence; modify an avatar motion model associated with a stored avatar to approximate the input motion model for the input motion sequence when the avatar motion model does not approximate the input motion model; and present the stored avatar after the avatar motion model associated with the stored avatar is modified to approximate the input motion model for the input motion sequence.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
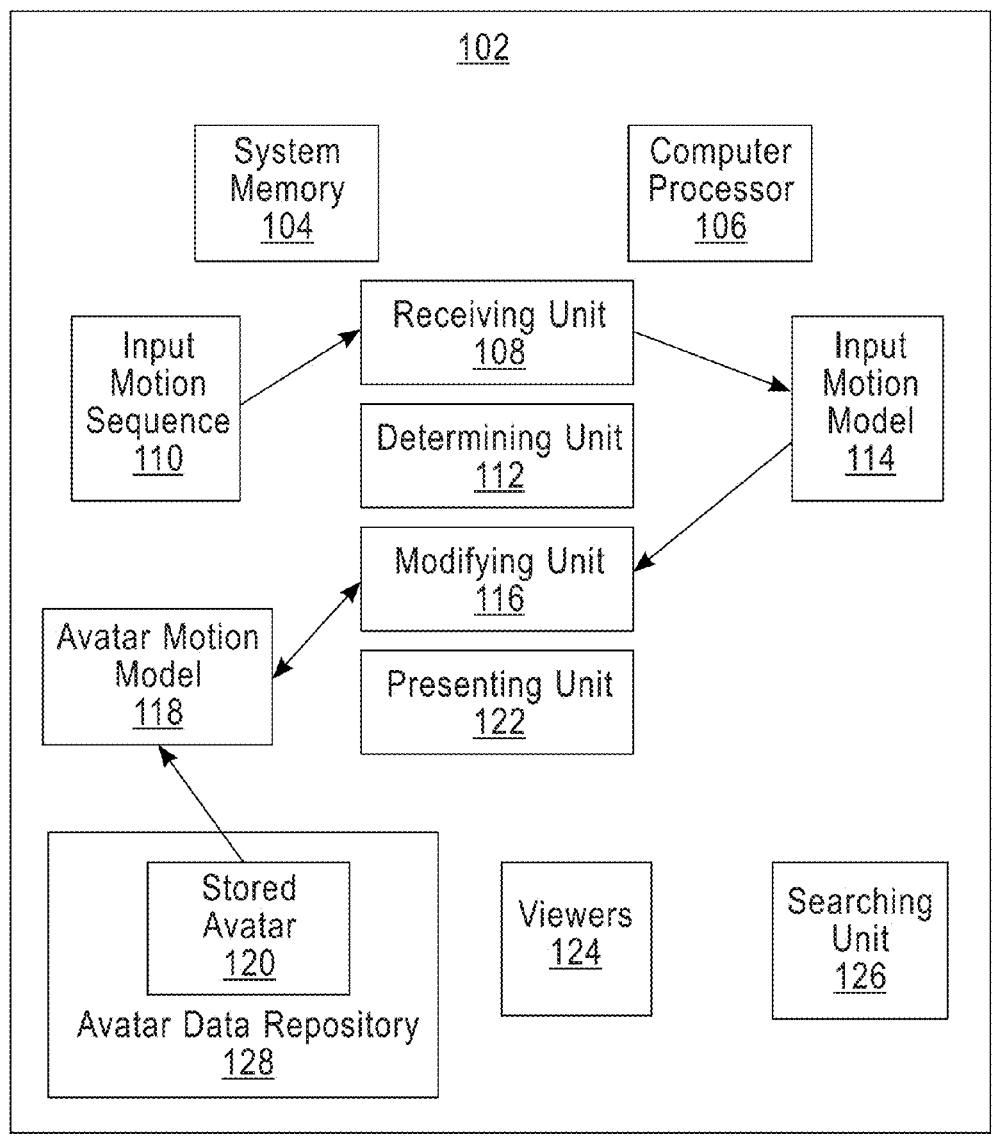
FIG. 1 shows a system for modifying avatar motion according to one embodiment of the present invention.

The present invention is described with reference to embodiments of the invention. Throughout the description of the invention reference is made to FIGS. 1-4. When referring to the figures, like structures and elements shown throughout are indicated with like reference numerals.

FIG. 1 shows a system 102 for modifying avatar motion according to one embodiment of the present invention. The system may include a system memory 104, a computer processor 106, a receiving unit 108, a determining unit 112, a modifying unit 116, and a presenting unit 122.

The receiving unit 108 is coupled to the computer processor 106 and the receiving unit 108 receives an input motion sequence 110. The determining unit 112 determines an input motion model 114 for the input motion sequence 110.

The modifying unit 116 modifies an avatar motion model 118 associated with a stored avatar 120 to approximate the input motion model 114 for the input motion sequence 110 when the avatar motion model 118 does not approximate the input motion model 114.

The presenting unit 122 presents the stored avatar 120 after the avatar motion model 118 associated with the stored avatar 120 may be modified to approximate the input motion model 114 for the input motion sequence 110.

In one embodiment of the invention, the computer processor 106 may be configured to select an input motion sequence 110 that is associated with a previously obtained input motion model 114. The input motion model 114 may model motion based on gestures, walking motions, facial motions, flying motions, hand motions and/or body motions. The input motion model 114 for the input motion sequence may be based on a smaller set of motion variables than the input motion sequence 110.

In one embodiment of the invention, the computer processor 106 may be configured to present different stored avatars 120 for different viewers 124 of the avatar motion. The presentation of the stored avatar 120 may be controlled, in real-time, by changing characteristics of the computing device and network.

In one embodiment, the computer processor 106 may further comprise a selecting unit 126. The searching unit 126 searches an avatar data repository 128 for the stored avatar 120 using the input motion model 114.

In one embodiment, the determining unit 112 may be further configured to determine a similarity measure between the input motion model and motion models of stored avatars in the avatar data repository, and select the stored avatar having the associated avatar motion model that is most similar to the input motion model using the similarity measure. The determining unit 112 may be further configured to restrict the search of the data repository based on metadata associated the stored avatar.

Figure 2:
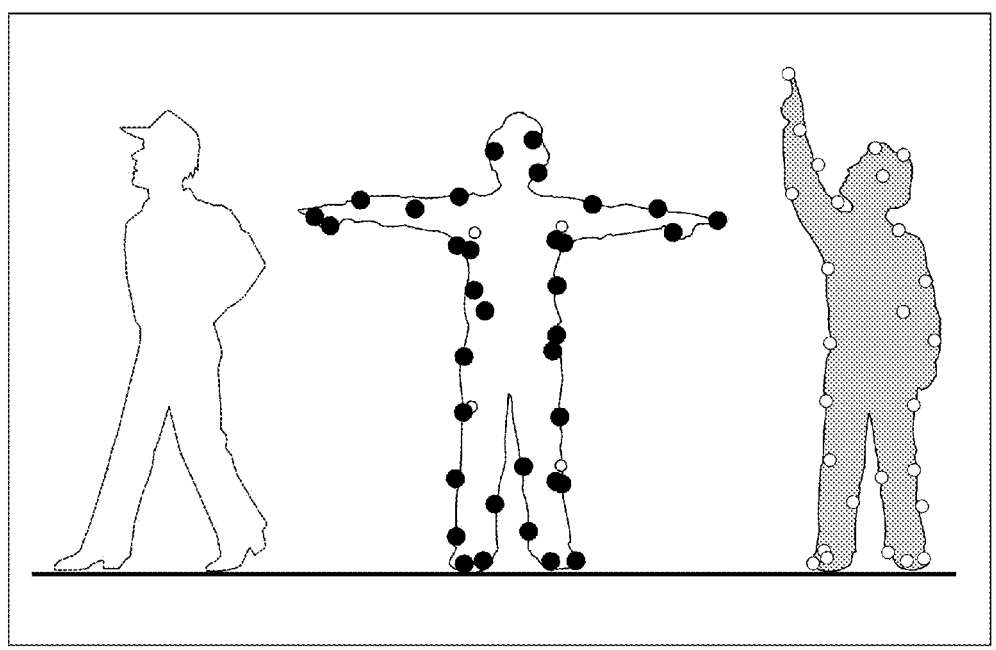
FIG. 2 shows motion capture of an individual according to one embodiment of the present invention.

A user may input a motion capture file as shown in FIG. 2. The system may then analyze these measures using a dimensionality reduction algorithm such as Principal Components Analysis, and assign it to a cluster in the motion preference library. In this way, a large number of movement-types can be searched automatically to approximate the desired measures (for example if the user wants the avatar to walk in the same way she does).

Figure 3:
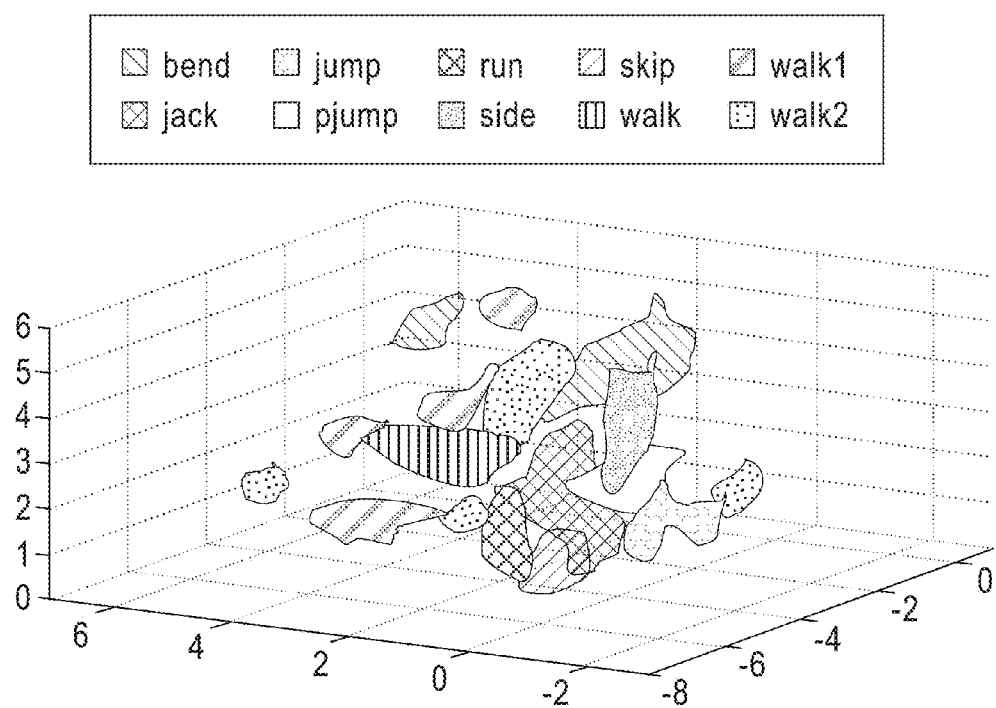
FIG. 3 shows gestures/movements embedded in a three dimensional space according to one embodiment of the present invention.

FIG. 3 shows gestures/movements embedded in a three dimensional space according to one embodiment of the present invention. The movements graphed include jump-in-place-on-two-legs ("pjump") and jumping-jack ("jack"). The system can make use of dimensionality reduction techniques, specifically techniques that aim to project the high-dimensional set of movement measurements into a low-dimensional space of a constrained physical plant (i.e. the motor plant, which is the part(s) of the body that actually move) and the commands that control it. This way, the lower dimensional model of the biomechanical apparatus responsible for generating the gestures/movements, as well as of the potentially lower-dimensional set of neural commands used to control this apparatus may be used as the motion characteristic identified in the system.

Furthermore, by modifying this apparatus, while maintaining other aspects of the control commands, a set of new gestures/movements can be modeled, bearing a similarity to what would be expected of the user given these modifications. For example, a user's movements may be analyzed and represented by the body and motor commands that may have generated these movements. This representation may constitute the motion characteristics of the system. The body may then be modified (i.e., a user is given very long legs, a set of wings, placed in different gravitational field, etc.) and the motion is then modified by the forward model that expands the low dimensional representation back into a higher dimensional set of movements, given the newly introduced constraints on the model.

Multiple segments of a motion capture may be analyzed separately and used to select by the above means a set of movements differentially, to create a composite movement-type for the avatar (for example, the avatar's walking behavior may be type 112.2, but its jumping behavior may be type 252.1). Note that the motion quality of the input motion (e.g., a motion attempted using a mouse, keyboard, or 3-D motion-capture device) may comprise a perceivable mood or an emotion of the input motion/gesture (e.g., happy, sad, confident, enthusiastic, contrite, etc.). A motion quality of the input motion may comprise a perceivable intention of the input motion (e.g., question, command, sarcasm, irony, etc.).

The desired motion quality may be manually selected based on a preference of the user (e.g., avatar controller) associated with the input motion (e.g., selectable via a user interface). The desired motion quality and characteristics may be automatically selected based on a substantive context associated with the input motion, and a determination as to how the output motion should appear to intended (or possible) recipients. In one embodiment, the desired motion quality may be automatically selected by analyzing the possible content and context of the input motion determining a motion approximate for how the motion should appear to achieve an objective. A motion approximate may be determined based on motion models previously created for the user of the avatar. Motion models may be created via background data collection (e.g., substantially transparent to the avatar controller) or via explicit data collection (e.g., with the user's express knowledge and/or participation).

Figure 4:
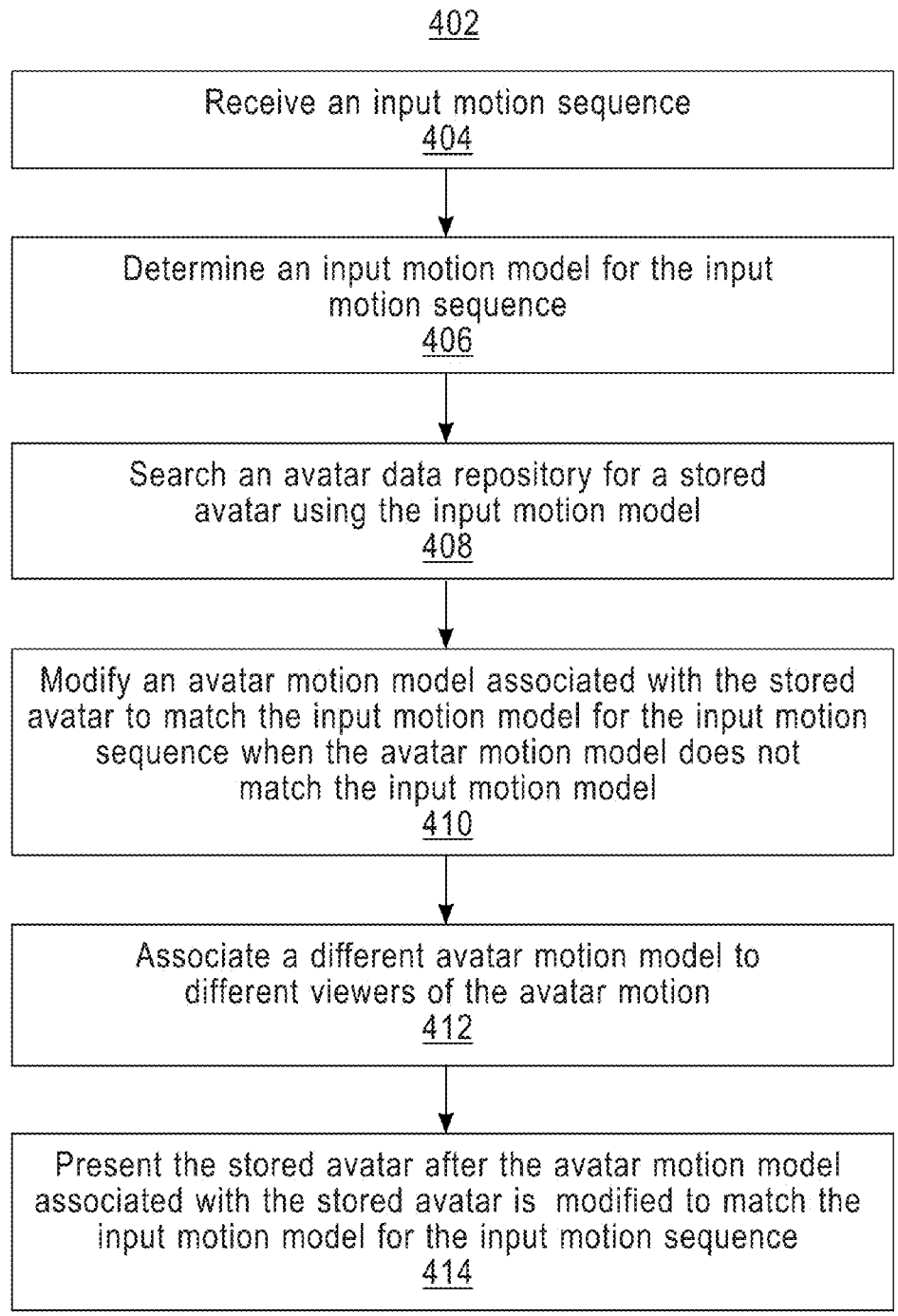
FIG. 4 shows a method for modifying avatar motion in accordance with one embodiment of the present invention.

FIG. 4 shows a method for modifying avatar motion 402, in accordance with one embodiment of the present invention. The method includes receiving step 404. During the receiving step 404, an input motion sequence may be received. The input motion sequence may be associated with a previously obtained input motion model. After receiving step 404 is completed, the method continues to determining step 406.

At determining step 406, an input motion model may be determined for the input motion sequence. The input motion model may model motion based on gestures, walking motions, facial motions, flying motions, hand motions and body motions. The input motion model for the input motion sequence may be based on a smaller set of motion variables than the input motion sequence. After determining step 406 is completed, the method continues to searching step 408.

At searching step 408, an avatar data repository may be searched for the stored avatar using at least part of the input motion model as a search key. A similarity measure may be determined between the input motion model, or part of the input motion model, and motion models of stored avatars in the avatar data repository. The stored avatar has the associated avatar motion model that is most similar to the input motion model using the similarity measure is selected. The search of the data repository may be restricted based on metadata associated the stored avatar. After searching step 408 is completed, the method continues to modifying step 410.

At modifying step 410, an avatar motion model associated with the stored avatar to approximate or match the input motion model for the input motion sequence is modified, when the avatar motion model does not approximate or match the input motion model.

In one embodiment, user marking (e.g., via a user interface) one or more motions may be used. The marked motions may be analyzed to determine subsequent desired motion qualities and characteristics. Further, it may include editing the content of the motion when it is determined to contain undesirable motions. The characteristic of the motion that is modified in the modifying step may comprise an overall set of motions and gestures associated with the input motion.

In another example embodiment, the characteristic of the motion may be modified prior to transmission of the motion (e.g., at user's computer terminal). In another embodiment, the characteristic of the motion may be modified after transmission of the motion (e.g., at the intended recipient, or viewer, end of the network). After modifying step 410 is completed, the method continues to associating step 412.

At associating step 412, a different avatar motion model may be associated to different viewers of the avatar motion. The stored avatar may be presented after the avatar motion model associated with the stored avatar is modified. This step may include presenting the stored avatar differently to the different viewers. After associating step 412 is completed, the method continues to presenting step 414.

At presenting step 414, the stored avatar may be presented after the avatar motion model associated with the stored avatar is modified to approximate or match the input motion model for the input motion sequence. The presentation of the stored avatar may be controlled, in real-time, by changing characteristics of the computing device and network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method performed by a computer processor for modifying avatar motion, the method comprising:
   receiving an input motion sequence by the computer processor coupled to computer memory;
   determining an input motion model for the input motion sequence;
   modifying an avatar motion model associated with a stored avatar stored in the computer memory to approximate the input motion model for the input motion sequence when the avatar motion model does not approximate the input motion model; and
   presenting the stored avatar after the avatar motion model associated with the stored avatar is modified to approximate the input motion model for the input motion sequence.

2. The method of claim 1, wherein the input motion sequence is associated with a previously obtained input motion model.

3. The method of claim 1, further comprising:
   associating a different avatar motion model to different viewers of the avatar motion; and
   wherein presenting the stored avatar after the avatar motion model associated with the stored avatar is modified includes presenting the stored avatar after the avatar motion model associated with the stored avatar is modified differently to the different viewers.

4. The method of claim 1, wherein the input motion model models motion based on at least one of gestures, walking motions, facial motions, flying motions, hand motions and body motions.

5. The method of claim 1, wherein the presentation of the stored avatar is controlled, in real-time, by changing characteristics of the computing device and network.

6. The method of claim 1, wherein the input motion model for the input motion sequence is based on a smaller set of motion variables than the input motion sequence.

7. The method of claim 1, further comprising searching an avatar data repository for the stored avatar using at least part of the input motion model.

8. The method of claim 7, further comprising:
   determining a similarity measure between the input motion model and motion models of stored avatars in the avatar data repository; and
   selecting the stored avatar using the similarity measure.

9. The method of claim 8, further comprising restricting the search of the data repository based on metadata associated the stored avatar.

10. A system for modifying avatar motion, the system comprising:
    a system memory;
    a computer processor coupled to the system memory;
    a receiving unit coupled to the computer processor, the receiving unit to receive an input motion sequence;
    a determining unit to determine an input motion model for the input motion sequence;
    a modifying unit to modify an avatar motion model associated with a stored avatar to approximate the input motion model for the input motion sequence when the avatar motion model does not approximate the input motion model; and
    a presenting unit to present the stored avatar after the avatar motion model associated with the stored avatar is modified to approximate the input motion model for the input motion sequence.

11. The system of claim 10, wherein the input motion sequence is associated with a previously obtained input motion model.

12. The system of claim 10, wherein the presentation of the stored avatar is different for different viewers of the avatar motion.

13. The system of claim 10, wherein the input motion model models motion based on at least one of gestures, walking motions, facial motions, flying motions, hand motions and body motions.

14. The system of claim 10, wherein the presentation of the stored avatar is controlled, in real-time, by changing characteristics of the computing device and network.

15. The system of claim 10, wherein the input motion model for the input motion sequence is based on a smaller set of motion variables than the input motion sequence.

16. The system of claim 10, further comprising a searching unit to search an avatar data repository for the stored avatar using at least part of the input motion model.

17. The system of claim 16, wherein the determining unit is further configured to determine a similarity measure between the input motion model and motion models of stored avatars in the avatar data repository, and select the stored avatar using the similarity measure.

18. The system of claim 17, wherein the determining unit is further configured to restrict the search of the data repository based on metadata associated the stored avatar.

19. A computer program product for modifying avatar motion, the computer program product comprising;
    a non-transitory computer readable storage medium having computer readable program code embodied therewith, the computer readable program code configured to:
    receive an input motion sequence;
    determine an input motion model for the input motion sequence;
    modify an avatar motion model associated with a stored avatar to approximate the input motion model for the input motion sequence when the avatar motion model does not approximate the input motion model; and present the stored avatar after the avatar motion model associated with the stored avatar is modified to approximate the input motion model for the input motion sequence.

20. The computer program product of claim 19, the computer readable program code further configured to:

search an avatar data repository for the stored avatar using the input motion model;

determine a similarity measure between the input motion model and motion models of stored avatars in the avatar data repository;

select the stored avatar using the similarity measure; and restrict the search of the data repository based on metadata associated the stored avatar; and wherein the input motion sequence is associated with a previously obtained input motion model;

wherein the presentation of the stored avatar is different for different recipients;

wherein the input motion model models motion based on at least one of gestures, walking motions, facial motions, flying motions, hand motions and body motions;

wherein the presentation of the stored avatar is controlled, in real-time, by the changing characteristics of the computing device and network; and wherein the input motion model for the input motion sequence is based on a smaller set of motion variables than the input motion sequence.

* * * * *